United States Patent [19]

Jones et al.

[11] 4,061,162

[45] Dec. 6, 1977

[54] HIGH TEMPERATURE AND SHOCK RESISTANT INSULATED PIPE

[75] Inventors: Henry B. Jones; Dorrance P. Bunn, Jr., both of Houston, Tex.

[73] Assignee: Texaco Inc., New York, N.Y.

[21] Appl. No.: 754,786

[22] Filed: Dec. 27, 1976

[51] Int. Cl.² ............................................. F16L 9/14
[52] U.S. Cl. .................................. 138/147; 138/149; 138/177
[58] Field of Search ............... 138/149, 147, 140, 151, 138/141, 148, 177, 178, 108, DIG. 6, 153

[56] References Cited

U.S. PATENT DOCUMENTS

| 2,451,145 | 10/1948 | Baker et al. | 138/149 |
| 3,170,289 | 2/1965 | Kramer | 138/149 |
| 3,933,182 | 1/1976 | Costes | 138/149 |
| 3,952,777 | 4/1976 | Uhlig | 138/149 |
| 4,015,636 | 4/1977 | Van Fossen | 138/149 |

FOREIGN PATENT DOCUMENTS 959,400  6/1964  United Kingdom ................. 138/140

Primary Examiner—William D. Martin, Jr.
Attorney, Agent, or Firm—Carl G. Ries; Thomas H. Whaley; Theron H. Nichols

[57] ABSTRACT

An insulated pipe is disclosed comprising a fiber felt batt or first layer secured to the pipe inner surface with studs protruding therethrough this first layer, a high temperature resistant metal shield mounted on the studs and contiguous to the first layer, and a metal grating reinforced erosion resistant castable refractory mounted over all and attached to the tops of the studs for providing an efficient, high temperature and shock resistant, internally insulated pipe.

14 Claims, 2 Drawing Figures

HIGH TEMPERATURE AND SHOCK RESISTANT INSULATED PIPE

BACKGROUND OF THE INVENTION

This invention pertains to a particular lining for insulating large diameter lines or pipes carrying high temperature gases and/or fluidized solids for forming a well insulated pipe which is resistant to high temperatures as well as resistant to shock loads and thus has high mechanical strength.

An exemplary pipe is a fluid catalytic cracking unit (FCCU) regenerator flue gas line for carrying gases at temperatures generally in the range of 1,000° to 1,500° F. (538°–816° C.) and pressures in the range of one to four atmospheres, absolute (1.0333–4.133 Kg/cm$^2$).

Various insulated pipes have been used, but the problems of providing a minimum of expansion in the pipe by having very good internal insulation and having the internal insulation strong enough to withstand stress due to pressure variations and solids flowing at high velocities therein are difficult to solve. Another problem to solve or purpose is to obviate high alloy construction where temperatures exceed those for which allowable stress values are set for carbon steel and low alloy steels, which steels are desired to be used in pipes. Two types of internal insulation for pipes have been used but they fail to withstand flowing conditions and/or stresses encountered in service.

1. Jacketed insulation (batts or block).

Materials having good insulating properties are usually low in mechanical strength. They have been used with a covering of metal sheet to protect them from damage by the high velocity flowing gas stream. These linings have had a relatively short service life. Metal sheeting has generally been eroded, torn, or otherwise damaged, and insulation has been removed by the gas flow. Wrinkling of the metal due to differential expansion, in excess of that allowed for, is though to have been a factor in some of these failures.

2. Castable, or gun-applied, insulation.

These linings may be monolithic applications of a medium weight refractory castable or a two component lining consisting of a layer of a light weight insulating castable protected by a layer of an erosion resistant, high density, refractory castable reinforced with carbon steel or an alloy steel hex metal grating. These have failed repeatedly in areas where lines are subject to vibration, particularly near regenerator flue gas slide valves and orifice chambers. In other cases, a castable insulating lining has been covered with a thin gauge metal jacket. In the latter cases, the metal sheet would apparently expand, vibrate, become wrinkled, flop around, and eventually tear loose, followed by deterioration of the castable insulating lining.

OBJECTS OF THE INVENTION

Accordingly, a principal object of this invention is to provide a pipe that is resistant to high internal temperatures as well as being resistant to high shock forces.

Another object of this invention is to provide an insulated pipe in which the internal insulation will withstand high vibration forces by damping pipe wall vibrations and yet maintain its resistance to heat loss from high velocity, high temperature fluids flowing therein.

A further object of this invention is to provide a pipe with a thinner lining and thus smaller pressure containing pipes having a greater flexibility to accommodate thermal expansion.

A still further object of this invention is to provide an internally insulated pipe that is easy to maintain, is of simple configuration, is economical to build and assemble, and provides greater insulating efficiency for providing high temperature resistance to passage of heat therethrough and for providing high mechanical strength in the insulation.

Other objects and various advantages of the disclosed high temperature and shock resistant pipe will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one form of the invention wherein like reference numerals designate corresponding parts in the several views in which.

DESCRIPTION OF THE PREFERRED EMBODIMENT

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

Figure 1:
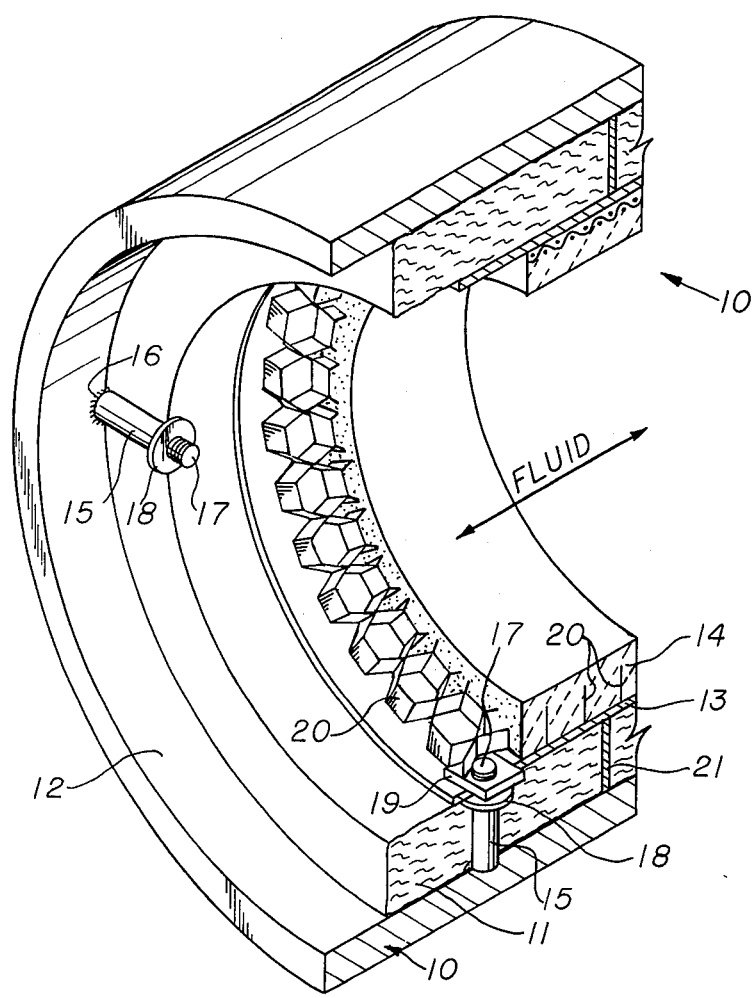
FIG. 1 is a perspective sectional view of a portion of the new insulated pipe illustrating details of the insulation therein.
Figure 2:
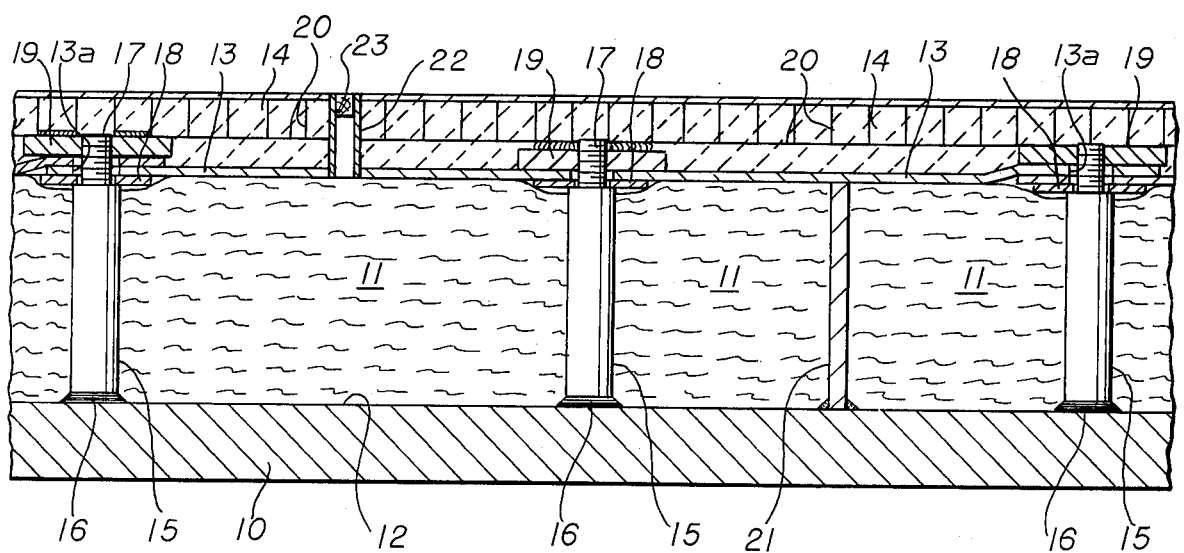
FIG. 2 is a schematic diagrammatic longitudinal vertical sectional view of the wall portion of a pipe with the new high temperature and shock resistant insulation mounted therein.

The disclosed high temperature and shock resistant insulated pipe 10, FIGS. 1 and 2 for transporting high velocity gas or fluidized solids comprise basically three components or elements:

1. a batt of fiber felt 11 as ceramic fiber secured to the inner cylindrical surface 12 of the pipe, 2. a high temperature resistant and tough metal shield 13, as overlapping sheets of stainless steel mounted contiguous with the inner surface of the fiber felt batt and secured to the pipe inner surface, and 3. an erosion resistant and metal reinforced castable refractory 14 mounted contiguous with the inner surface of the high temperature resistant and tough metal shield and secured to the pipe inner surface.

A typical example of the invention is an FCCU regenerator flue gas line or insulated pipe 10, FIGS. 1 and 2, from 3 to 10 feet in diameter for carrying 1,000°–1,500° F. gases at pressures from 1 to 3 atmospheres (absolute). The pipe 10 or vessel wall may comprise a carbon or low alloy steel material ½ to 2 inches (1.25–5 cm) thick. 18-8 stainless steel studs 15 are welded to the inner surface 12 of the pipe 10 on a staggered pattern with about 9 inch (22.5 cm) spacing. Studs 15 have large ends 16 and smaller ends 17. The stud large ends 16 are fixedly secured, as by welding, to the pipe inner surface 12 and the opposite smaller stud ends 17 are threaded. The length of the studs is slightly less than the uncompressed thickness of the sheets or batts of fiber felt, such as but not limited to, ceramic fiber 11.

After the batts of fiber felt or ceramic fiber 11, FIGS. 1 or 2, are impaled on the studs and pressed against the pipe inner surface 12, retaining means such as but not limited to press fit or threaded plates, washers or nuts 18 of 18-8 stainless steel, for example, are placed or secured on the stud inner smaller ends 17 to press the batts or ceramic fiber down slightly to maintain them firmly against the pipe inner wall surface 12.

A high temperature resistant and tough metal shield 13, FIGS. 1 and 2, such as but not limited to, overlapping sheets of 18-8 stainless steel, having oversize holes 13a to allow for differential expansion is positioned on top of the batt of ceramic fiber 11 and the studs 15. The stud smaller, threaded ends 17 protrude through the oversize holes in stainless steel sheets 13 and a fastening means, such as but not limited to, threaded plates, washers, or nuts such as 2 inch square by ¼th inch thick washers 19 with threaded holes are placed on and secured as by being threaded on or welded to the stud smaller ends 17 for securing the stainless steel shield 13 down in pipe 10.

The third basic and innermost element or component to be fastened down in the pipe 10, FIG. 2, is the erosion resistant and metal reinforced castable refractory 14 which comprises an erosion resistant castable refractory means impregnated with a metal grating means 20. The latter grating means 20 may comprise a ⅜ inch thick 18-8 stainless steel, carbon steel, or a low alloy steel Hexmetal grating preformed to the proper radius of curvature and fixedly secured as by welding to the square washers. The reinforcing grating 20 must extend from the surface of the washers 19 to the inner surface of the refractory 14. Thus the castable refractory will fill all voids from the inner surface of the grating outwardly to the inner surface of the metal shield, including the space approximating the thickness of the square washers between the outer surface of the grating and the inner surface of the metal shield.

FIG. 2 discloses further a vapor stop ring 21 fixedly secured, as by welding, to the inner surface 12 of the pipe and coaxial therewith. This ring likewise may be formed of 18-8 stainless steel and extends inwardly of the pipe from the pipe inner surface to the thin high temperature resistant and tough metal shield 13. Several rings 21 are formed and spaced between 3 and 5 feet apart along the length of the above exemplary pipe. A vent pipe 22, as of ¼ inch 18-8 stainless steel tubing, protrudes radially through the erosion resistant castable refractory between each two vapor top rings and has a removable or burnable plug 23 initially pressed therein. With the vapor stop ring and the vent pipe therein, the vapors trapped in the insulation may escape upon heating thereof as the 1,000° to 1,500° F. fluids flow through the pipe.

Accordingly, a very efficient high temperature and shock resistant insulated pipe is disclosed. Since the thermal conductivity of fiber felt as a ceramic fiber is far lower than the thermal conductivity of insulating castable materials, the insulating value of this pipe lining will be significantly greater than that of the known castable lining for pipes.

Thus, the disclosed lining may be thinner and thus may be used in smaller pipes and/or greater flexibility to accommodate thermal expansion results.

A very important feature is that the resilience of the fiber felt or ceramic fiber layer will dampen pipe wall vibrations and accordingly reduce the likelihood of damage to the inelastic castable refractory.

Further in the event the castable refractory 14 is shaken out of the hexmetal grating 20 by extreme vibrations or due to faulty installation, the ceramic fiber insulation 11 will be held in place by the shield of 18-8 stainless steel sheets 13 and which shield will be protected by the Hexmetal grating.

Thus the novel combination of elements or components of a fiber felt batt 11, a high temperature resistant metal shield 13, and the erosion resistant and metal reinforced castable refractory 14 formed in a pipe form the new high temperature and shock resistant insulated pipe.

Accordingly, it will be seen that the above disclosed high temperature and shock resistant pipe will operate in a manner which meets each of the objects set forth hereinbefore.

While only one mechanism has been disclosed, it will be evident that various other modifications are possible in the arrangement and construction of the disclosed high temperature and shock resistant pipe without departing from the scope of the invention and it is accordingly desired to comprehend within the purview of this invention such modifications as may be considered to fall within the scope of the appended claims.

We claim:

1. A high temperature and shock resistant insulated pipe for transporting high velocity gas or fluidized solids comprising,
   a. a pipe having an inner surface,
   b. a batt of fiber felt secured to said pipe inner surface,
   c. a high temperature resistant metal shield mounted contiguous with the inner surface of said fiber felt batt and secured to the pipe inner surface, and
   d. an erosion resistant and metal reinforced castable refractory mounted contiguous with the inner surface of said high temperature resistant metal shield and secured to the pipe inner surface for providing a high temperature resistant and high mechanical strength insulated pipe.

2. An insulated pipe as recited in claim 1 wherein,
   a. a plurality of studs are fixedly secured to said pipe inner surface,
   b. said fiber felt batt being a ceramic fiber batt,
   c. said studs protrude through said ceramic fiber batt, and
   d. fastening plate means on top of each stud for securing said ceramic fiber batt to said pipe inner surface.

3. An insulated pipe as recited in claim 1 wherein,
   a. said high temperature resistant metal shield being overlapping sheets of stainless steel with a plurality of oversize holes therein,
   b. said studs having slender upper ends protruding through said oversize holes in said stainless steel sheets, and
   c. fastening plate means on top of each stud slender end for securing said stainless steel sheets contiguous with the inner surface of said fiber felt batt.

4. An insulated pipe as recited in claim 1 wherein, a. studs mounted on said pipe inner surface protrudes through both said fiber felt batt and said high temperature resistant metal shield,
b. fastener plate means on the top of each of said studs,
c. a layer of metal grating fixedly attached to said fastener plate means on each of said studs, and
d. an erosion resistant castable refractory being impregnated with said layer of metal grating.

5. An insulated pipe as recited in claim 1 wherein,
a. a vapor stop ring having its outer peripheral edge fixedly secured to said pipe inner surface,
b. said vapor stop ring protruding through said fiber felt batt to said high temperature resistant metal sheet, and
c. a vent hole extending radially through said erosion resistant castable refractory for venting the vapors from internally of the insulation for preventing pressure buildup and damage therein.

6. A high temperature and mechanical strength insulated pipe comprising,
a. pipe means having an inner surface,
b. fiber felt batt means for said pipe means inner surface,
c. high temperature resistant metal shield means contiguous with the inner surface of said fiber felt batt means, and
d. erosion resistant castable refractory means contiguous with the inner surface of said high temperature resistant metal shield means for providing a high temperature resistant and high mechanical strength insulated pipe.

7. An insulated pipe as recited in claim 6 wherein,
a. said pipe means inner surface has a plurality of stud means thereon,
b. said stud means protrudes inwardly through said fiber felt batt means, and
c. fastening plate means on top of each stud means for securing said fiber felt batt means to said pipe means inner surface.

8. An insulated pipe as recited in claim 7 wherein,
a. said fiber felt batt means comprises a ceramic fiber, and
b. said fastening plate means secures ceramic fiber batt means to said pipe means inner surface.

9. An insulated pipe as recited in claim 8 wherein,
a. each of said stud means has an outer end welded to said pipe means inner surface,
b. each of said stud means has a threaded inner end, and
c. said fastening plate means comprising a plate threaded on the threaded end of each stud means for securing said ceramic fiber batt means to said pipe means inner surface.

10. An insulated pipe as recited in claim 6 wherein,
a. said high temperature resistant metal shield means being a plurality of overlapping stainless steel sheets with a plurality of oversize holes therein,
b. each of said stud means has slender upper ends protruding through said oversize holes in said stainless steel sheets, and
c. each stud means has fastening means thereon for securing said stainless steel sheets contiguous with the inner surface of said fiber felt batt means.

11. An insulated pipe as recited in claim 10 wherein,
a. each of said stud means has an outer end welded to said pipe means inner surface,
b. each of said stud means has a threaded inner end, and
c. each of said fastening means being threaded on a stud threaded inner end for securing said stainless steel sheets contiguous with the inner surface of said fiber felt batt means.

12. An insulated pipe as recited in claim 6 wherein,
a. said pipe means inner surface has a plurality of stud means thereon,
b. fastening plate means for the top of each of said stud means for maintaining said high temperature resistant metal shield means contiguous with the inner surface of said fiber felt batt means,
c. a layer of metal grating means attached to each of said fastening plate means, and
d. erosion resistant castable refractory means being impregnated with said layer of metal grating means.

13. An insulated pipe as recited in claim 12 wherein,
a. each of said stud means has an outer end welded to said pipe inner surface,
b. the inner end of each of said stud means being theaded,
c. each of said fastening plate means being a plate threaded on said threaded inner end of each of said stud means for maintaining said high temperature resistant metal shield means contiguous with the inner surface of said fiber felt batt means, and
d. said layer of metal grating means being welded to each of said threaded fastening plates on said stud means.

14. An insulated pipe as recited in claim 6 wherein,
a. said pipe means inner surface has a vapor stop ring welded thereto aligned coaxially with the longitudinal axis of said pipe means, and
b. vent hole means extending radially through said erosion resistant castable refractory means and said metal shield for venting the vapors from internally of the insulation for preventing pressure buildup and damage therein.

* * * * *